US012559600B2

(12) United States Patent
Gao et al.

(10) Patent No.: US 12,559,600 B2
(45) Date of Patent: Feb. 24, 2026

(54) POLYETHYLENE COMPOSITE FOR FLEXIBLE DISPLAY SCREEN

(71) Applicant: THE HONG KONG UNIVERSITY OF SCIENCE AND TECHNOLOGY, Hong Kong (CN)

(72) Inventors: Ping Gao, Hong Kong (CN); Qiao Gu, Hong Kong (CN); Zichao Dai, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 131 days.

(21) Appl. No.: 18/186,260

(22) Filed: Mar. 20, 2023

(65) Prior Publication Data

US 2023/0295390 A1 Sep. 21, 2023

Related U.S. Application Data

(60) Provisional application No. 63/322,213, filed on Mar. 21, 2022.

(51) Int. Cl.
*C08J 7/04* (2020.01)
*C08K 3/36* (2006.01)
*C09D 133/08* (2006.01)

(52) U.S. Cl.
CPC ...... *C08J 7/04* (2013.01); *C08K 3/36* (2013.01); *C09D 133/08* (2013.01); *C08J 2323/06* (2013.01); *C08J 2333/08* (2013.01)

(58) Field of Classification Search
CPC ................ C08J 2323/06; C08J 2333/08; C08J 2433/08; C08J 7/04; C08J 7/046; C08K 3/36; C09D 133/08
See application file for complete search history.

(56) References Cited

U.S. PATENT DOCUMENTS

2004/0090426 A1 5/2004 Bourdelais et al.
2010/0301258 A1* 12/2010 Chen .......................... C08J 5/18
428/220

(Continued)

FOREIGN PATENT DOCUMENTS

CN 103450495 A 12/2013
CN 105911618 B 1/2020

(Continued)

OTHER PUBLICATIONS

Feng, C., et al., "Flexible, Stretchable, Transparent Conducting Films Made from Superaligned Carbon Nanotubes," Advanced Functional Materials, 2010, 20:885-891.

*Primary Examiner* — Hai Vo
(74) *Attorney, Agent, or Firm* — SALIWANCHIK, LLOYD & EISENSCHENK

(57) ABSTRACT

A composite material and methods for making a foldable material are provided. The composite material includes ultra-high molecular weight polyethylene (UHMWPE) and a hard coating material, a portion of the hard coating material being infiltrated into the UHMWPE. The UHMWPE has a highly porous structure of polyethylene and the hard coating material is in a liquid form. The UHMWPE can be formed as a layer on which another portion of the hard coating material is disposed. The layer of UHMWPE has a thickness smaller than 2 μm, a tensile strength greater than 500 MPa, and the composite has a thickness smaller than 5 μm, a tensile strength greater than 100 MPa. And the whole composite is crease free after more than 200,000 cycles of folding.

4 Claims, 4 Drawing Sheets

→ Hard coating

→ PE plus hard coating blend

(56)           References Cited

U.S. PATENT DOCUMENTS

| 2017/0306093 A1 | 10/2017 | Matsumaru et al. | |
| 2017/0326851 A1 | 11/2017 | Mochizuki et al. | |
| 2020/0101427 A1* | 4/2020 | Gao | A23L 2/085 |
| 2020/0347271 A1 | 11/2020 | Erdogan-Haug et al. | |
| 2021/0375167 A1 | 12/2021 | Lin | |
| 2023/0398771 A1* | 12/2023 | Wang | B32B 17/10 |

FOREIGN PATENT DOCUMENTS

| CN | 212970396 U | 4/2021 |
| JP | 4490217 B2 | 6/2010 |
| JP | 7027867 B2 | 3/2022 |
| WO | 2019/065624 A1 | 4/2019 |
| WO | 2020/059813 A1 | 3/2020 |

\* cited by examiner

→ Hard coating

→ PE plus hard coating blend

POLYETHYLENE COMPOSITE FOR FLEXIBLE DISPLAY SCREEN

CROSS-REFERENCE TO RELATED APPLICATION

This application claims the benefit of U.S. Ser. No. 63/322,213, filed Mar. 21, 2022, which is hereby incorporated by reference in its entirety including any tables, figures, or drawings.

BACKGROUND OF THE INVENTION

Foldable screen has attracted great attentions in recent years as a next-generation display technology to solve the issue of conflicting requirements of portability and display area. One of the key problems that hinders wide applications of the foldable display is the development of foldable substrates and screen protectors. Among all the materials, flexible transparent plastic films have been considered as the most promising alternative to replace commonly used tempered glass for current foldable displays.

The tempered glass has been the primary choice for covering windows of rigid displays due to its excellent scratch resistance and overall screen protection. Ideally, possible approach to make the glass flexible is to reduce its thickness, which nevertheless would induce huge concerns about extra brittleness when the glass becomes thinner. In reality, the replacement for thick tempered glass is likely to be a combination of plastic films and flexible hard coatings to provide glass-like hardness for scratch resistance, excellent transparency, and polymer-like flexibility to allow high deformation without breaking.

Unfortunately, state-of-the-art technology developed for fabrication of foldable screen protector/substrate cannot fully fulfill the requirements for high transparency, excellent scratch resistance, crease free, and good mechanical robustness.

For the screen covers of smartphones to protect the display screens, it requires that the screen covers are both resilient and flexible. Colorless Polyimide (CPI) and Polyethylene terephthalate (PET) films are the two main materials used in the flexible display industrials. However, a big problem for CPI or PET films is that creases appear when the films are folded many times.

BRIEF SUMMARY OF THE INVENTION

There continues to be a need in the art for improved designs and techniques for a composite material and methods for making flexible display screens.

According to an embodiment of the subject invention, a composite material for making a foldable material is provided, comprising ultra-high molecular weight polyethylene (UHMWPE) and a hard coating material, a first portion of the hard coating material being infiltrated into the UHMWPE. The UHMWPE has a highly porous structure of polyethylene. The hard coating material is in a liquid form. Moreover, the UHMWPE is formed as a layer on which a second portion of the hard coating material is disposed. The layer of UHMWPE has a thickness smaller than 2 μm. The layer of UHMWPE has a tensile strength greater than 500 MPa.

In certain embodiment of the subject invention, a flexible screen for making a foldable or rollable display is provided, comprising: the composite material described above, the composite material being configured such that when a hard object scratches the flexible screen, the flexible screen exhibits a scratching hardness resistance greater than 5H.

In certain embodiment of the subject invention, a flexible screen for making a foldable or rollable display is provided, comprising: the composite material described above, the composite material being configured such that when light propagates through the flexible screen, a light transmittance greater than 90% for visible light is obtained.

In some embodiment of the subject invention, a transparent substrate for an optical device is provided, comprising the composite material described above, the composite material being configured such that when a hard object scratches the transparent substrate, the transparent substrate exhibits a scratching hardness resistance greater than 5H.

In some embodiment of the subject invention, a transparent substrate for an optical device is provided, comprising the composite material described above, the composite material being configured such that when light propagates through the transparent substrate, a light transmittance greater than 90% for visible light is obtained.

In another embodiment of the subject invention, a method for fabricating a composite for making a foldable or rollable display is provided, comprising preparing a nanoporous ultra-high molecular weight polyethylene (UHMWPE) substrate; and depositing a hardening coating material on a top surface of the UHMWPE substrate to allow a portion of the hardening coating material to permeate interior structures of the UHMWPE substrate. The UHMWPE substrate has a highly porous structure of polyethylene. The hardening coating material is in a liquid form. The hard coating is made up of acrylate oligomer and amorphous silica. Further, the solvent of coating can form a wide range of organic solvents including but not limited to acetone, acetonitrile, methyl ethyl ketone, or propylene glycol methyl ether. The hard coating liquid can be infiltrated into the UHMWPE by spin coating, dip coating, blade coating and bar coating. Moreover, the UHMWPE substrate is formed as a layer on which the hardening coating material is disposed. The layer of UHMWPE has a thickness smaller than 2 μm. The layer of UHMWPE has a tensile strength greater than 500 MPa. The whole layer of composite has a thickness smaller than 5 μm. The composite has a tensile strength greater than 100 MPa. The whole layer of the composite is crease free after N cycles of folding, wherein N is an integer greater than 200,000.

DETAILED DISCLOSURE OF THE INVENTION

The embodiments of the subject invention pertain to an ultrathin polymer solid composite that includes a layer of ultra-high molecular weight polyethylene and a layer of hard coating and a method for fabricating the ultrathin polymer solid composite having excellent scratch resistance, high transparency, and good mechanical strength for making crease-free foldable display screens.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
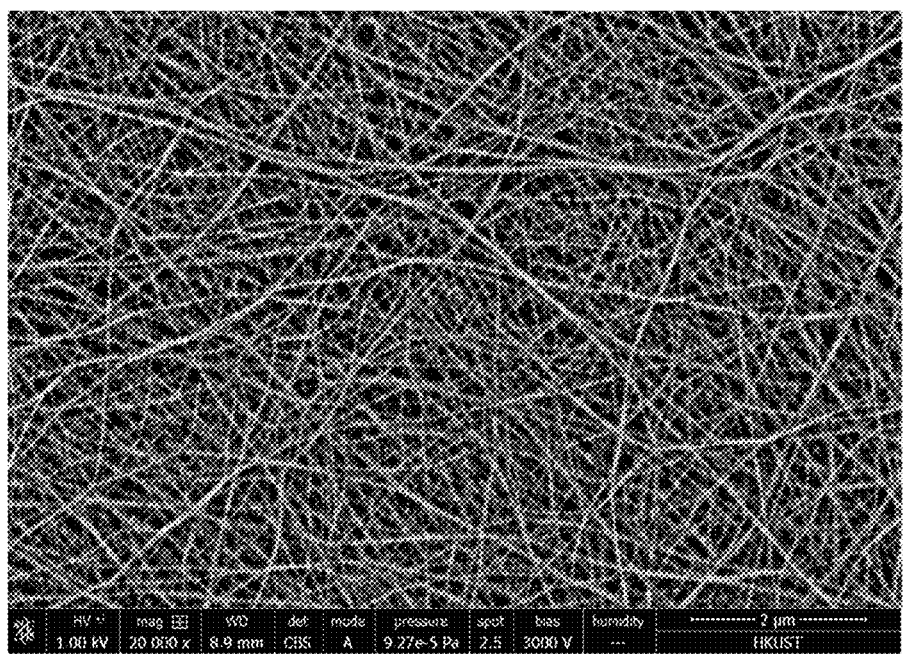
FIG. 1 shows that the highly porous structure is made of interpenetrating 10-40 nm diameter nanofibrils of UHMWPE wherein each fiber comprises of highly aligned extended-chain fiber crystals comprising folded chain lamella crystals, according to an embodiment of the subject invention.

Referring to FIG. 1, the highly porous structure of UHMWPE is shown. This highly porous structure is made of interpenetrating 10-40 nm diameter nanofibrils of UHMWPE wherein each fiber comprises of highly aligned extended-chain fiber crystals comprising folded chain lamella crystals. The porosity is greater than 50%.

Figure 2:
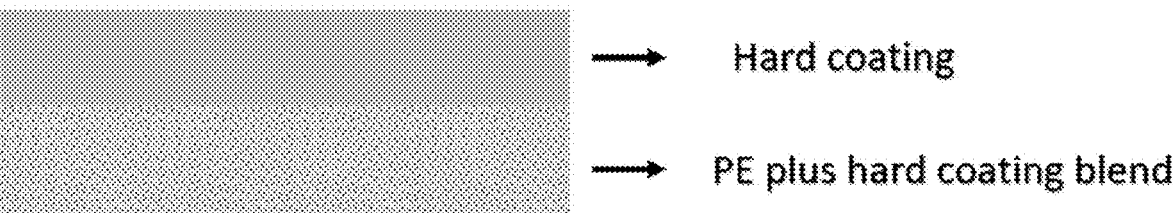
FIG. 2 is a schematic representation showing the structure of the composite comprising a UHMWPE film and a hard coating, according to an embodiment of the subject invention.
Figure 3:
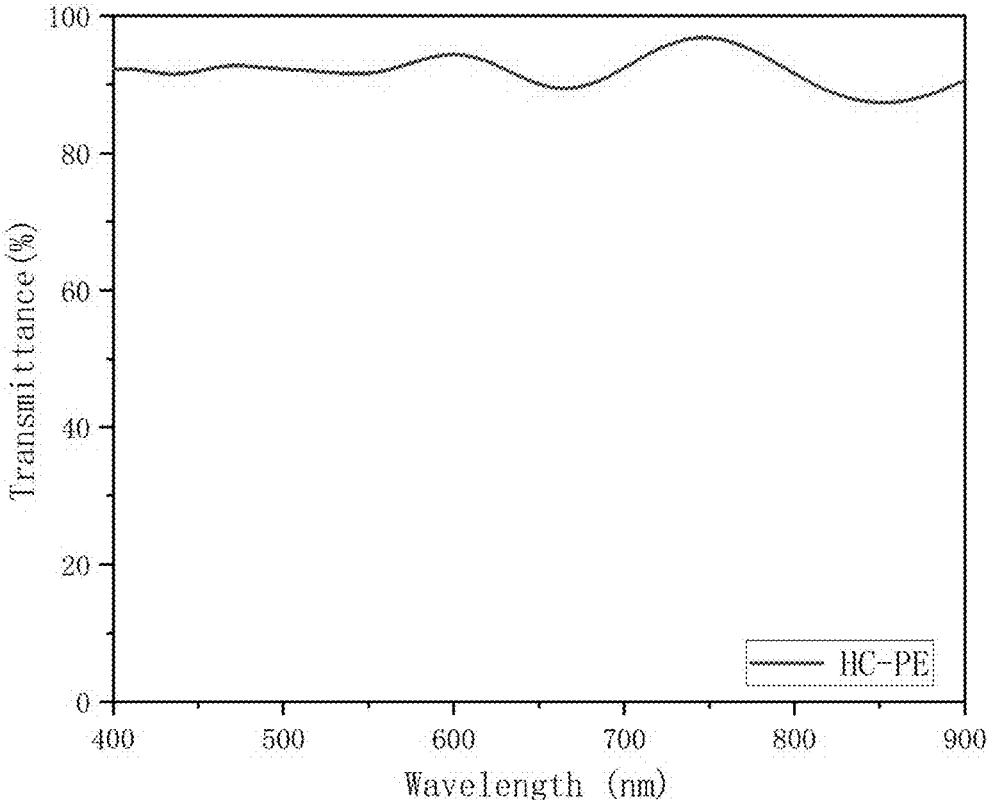
FIG. 3 shows results of light transmittance tests performed on the composite comprising the transparent UHMWPE film and the hard coating, according to an embodiment of the subject invention.

Referring to FIG. 2, the structure of the ultrathin polymer solid composite is shown. The composite comprises a layer of ultra-high molecular weight polyethylene (UHMWPE) and a layer of a hard coating material, wherein the UHMWPE layer serves as a supporting material and the hard coating material is infiltrated into the UHMWPE layer for making a flexible screen cover. Thanks to the reduction of total thickness, light transmittance of the light passes through the composite can be significantly increased to a level greater than 90% for visible light as shown in FIG. 3.

Figure 5:
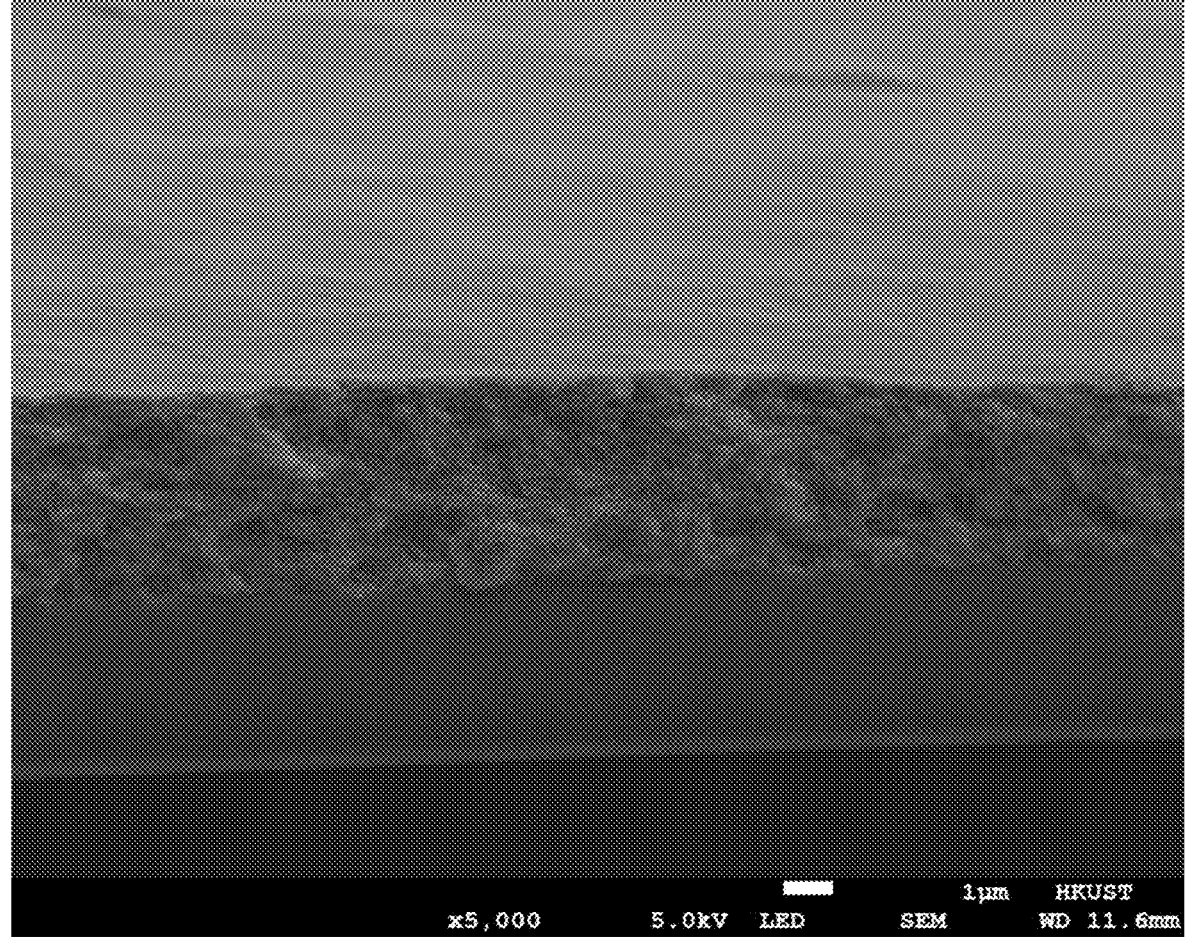
FIG. 5 shows a scanning electron microscope (SEM) image of cross-sections of the composite comprising the transparent UHMWPE film and the hard coating, according to an embodiment of the subject invention, according to an embodiment of the subject invention.

Moreover, because the UHMWPE layer has a highly porous structure of polyethylene, when the UHMWPE layer is permeated with the hard coating material, the nanoscale fibers form strong van der Waals attractions by providing high specific surface areas for binding with the hard coating. As a result, the adhesion force between the UHMWPE layer and the layer of a hard coating material is considerably enhanced due to the increase of the contacting areas and excellent rigidity and hardness can be obtained. FIG. 5 shows a scanning electron microscope (SEM) image of cross-sections of the composite comprising the transparent UHMWPE film and the hard coating material.

In one embodiment of the subject invention, a method for fabricating ultrathin polymer solid composite for making a flexible display screen that is transparent, foldable/rollable, and anti-resistance is provided. The method includes a first step of preparing a nanoporous UHMWPE substrate having a thickness smaller than 2 μm and a tensile strength greater than 500 MPa and a second step of depositing a liquid hardening coating material on a top surface of the UHMWPE substrate by spin coating, bar coating or dip coating to allow the liquid hardening coating material to permeate the interior structure of the UHMWPE substrate.

Figure 4:
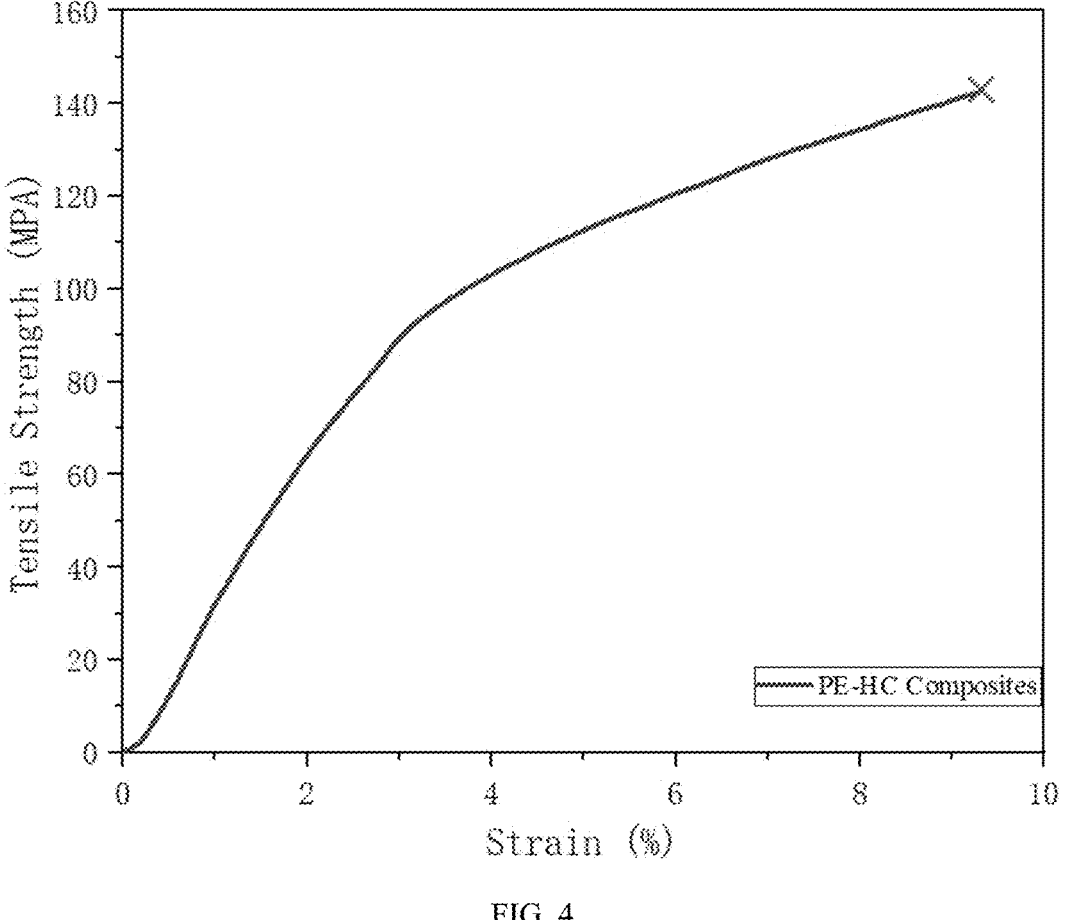
FIG. 4 shows results of tensile stress-strain tests performed on the composite comprising the transparent UHMWPE film and the hard coating, according to an embodiment of the subject invention, according to an embodiment of the subject invention.

The ultrathin polymer solid composite provides a number of advantages. For visible light, a transmittance greater than 90% is obtained at 500 nm as shown in FIG. 3. Moreover, the composite has excellent scratch resistance (>5H pencil test) and exhibits good mechanical robustness after the coating reaction (for example, a tensile strength greater than 100 MPa as shown in FIG. 4). Further, the composite is crease free after a great number, for example, 200,000 cycles, of folding.

Further, the UHMWPE layer including a linear flexible polymer material with extremely low molecular chain steric hindrance does not generate any fatigue effects after repeated folding and provides outstanding mechanical properties and transparency. When the UHMWPE layer is permeated with the hard coating material, excellent rigidity and hardness can be obtained.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A flexible screen for a foldable or rollable display, comprising a composite material, the composite material comprising:

an ultra-high molecular weight polyethylene (UHMWPE) layer; and a hard coating material made up of an acrylate oligomer and amorphous silica, wherein a first portion of the hard coating material is infiltrated into the UHMWPE layer and a second portion of the hard coating material is disposed on the UHMWPE layer, wherein the UHMWPE layer has a highly porous structure made of interpenetrating nanofibrils of UHMWPE having diameters in a range between 10 nm and 40 nm, wherein the UHMWPE layer has a thickness of less than 2 μm, and wherein the composite material has a total thickness of less than 5 μm, a tensile strength greater than 100 MPa, and a visible light transmittance greater than 90%.

2. The flexible screen of claim 1, wherein the hard coating material is deposited in a liquid form.

3. The flexible screen of claim 1, wherein the UHMWPE layer has a tensile strength greater than 500 MPa.

4. The flexible screen of claim 1. wherein entire surfaces of the composite material are crease free after N cycles of folding, wherein N is an integer greater than 200,000.

\* \* \* \* \*